United States Patent
Lorieau et al.

(10) Patent No.: US 6,188,884 B1
(45) Date of Patent: Feb. 13, 2001

(54) TELEPHONY DEVICE COMPRISING A DIGITAL PROCESSING ELEMENT FOR SPEECH SIGNALS AND METHOD IMPLEMENTED IN SUCH A DEVICE

(75) Inventors: Christophe Lorieau, Guecelard; Mylène Ryon, Louplande, both of (FR)

(73) Assignee: U.S. Philips Corporation, New York, NY (US)

( * ) Notice: Under 35 U.S.C. 154(b), the term of this patent shall be extended for 0 days.

(21) Appl. No.: 09/037,104

(22) Filed: Mar. 9, 1998

(30) Foreign Application Priority Data

Mar. 11, 1997 (FR) .................................................. 97 02869
Nov. 28, 1997 (FR) .................................................. 97 15029

(51) Int. Cl.⁷ .................................................. H04M 3/00
(52) U.S. Cl. ..................... 455/412; 455/413; 455/517; 455/561; 455/72; 379/88.07; 379/88.23; 704/212; 704/219; 704/229
(58) Field of Search .................................... 455/412, 413, 455/517, 561, 72; 379/88.07, 88.23; 704/212, 229–230, 219–220

(56) References Cited

U.S. PATENT DOCUMENTS

| 4,964,168 | * | 10/1990 | Bierlein et al. | 379/88.07 |
| 5,528,666 | * | 6/1996 | Weigand et al. | 379/88.07 |
| 5,583,915 | * | 12/1996 | Ishida | 379/88.07 |
| 5,588,046 | * | 12/1996 | Knuth et al. | 379/88.07 |
| 5,883,940 | * | 3/1999 | Thornton | 379/88.02 |
| 5,894,506 | * | 4/1999 | Pinter | 455/412 |
| 5,896,442 | * | 4/1999 | Song et al. | 379/88.02 |
| 5,953,391 | * | 9/1999 | Denmochi | 379/88.23 |
| 5,956,389 | * | 9/1999 | Jung | 379/88.23 |
| 5,966,651 | * | 10/1999 | Sibecas | 455/412 |
| 6,044,262 | * | 3/2000 | Hirayama | 455/412 |

FOREIGN PATENT DOCUMENTS

| 2254524A | 10/1992 | (GB) . |
| 08317023 | 11/1996 | (JP) . |
| WO9534984 | 12/1995 | (WO) . |

* cited by examiner

Primary Examiner—Lee Nguyen
Assistant Examiner—Simon Nguyen
(74) Attorney, Agent, or Firm—Dicran Halajian

(57) ABSTRACT

A telephony device includes a base station and a wireless handset. The base station has a responder with a memory. A processor of base station processes digital speech signals having a first code on signal lines connecting the input and output of the base station. The same processor also controls a converter which is located between the memory and the signal lines. Prior to storing in the memory, the converter codes the digital speech signals into a second code for storage in the memory, where the second code is the same code of the digital signals exchanged between the base station and the handset. Further, prior to reading from the memory, the converter decodes the digital speech signals of the second code stored in the memory into the first code.

15 Claims, 3 Drawing Sheets

TELEPHONY DEVICE COMPRISING A DIGITAL PROCESSING ELEMENT FOR SPEECH SIGNALS AND METHOD IMPLEMENTED IN SUCH A DEVICE

FIELD OF THE INVENTION

The invention relates to a telephony device comprising at least one digital processing element for processing digital speech signals and a digital type of responder.

The invention also relates to a method implemented in such a device.

The invention finds interesting applications, notably in the field of telephones comprising a digital type of responder, for example, those satisfying the DECT standard. These digital responders are more and more indispensable because of their ease of use combined with their large robustness.

BACKGROUND OF THE INVENTION

In telephony devices of the DECT type which comprise digital processing elements, the responder has to comprise its own converter, so that the data it produces or receives are adapted to the storage of the longest possible messages for a reasonable storage capacity while the criterions of an acceptable intelligibility are complied with.

SUMMARY OF THE INVENTION

The present invention proposes a device of the type defined in the opening paragraph which carries out the function of responder without needing such hardware.

Therefore, such a device is characterized in that it comprises processing control means so that said processing element also processes the speech signals for said responder.

The idea of the invention consists of benefiting from the presence of the converter already used in the device and from making the converter operate so that the requirements regarding the duration and intelligibility of recorded messages in the responder are satisfied by utilizing at least one coding format for the responder.

According to one embodiment, selection means are provided for the user to determine one of the formats with regard to the responder, which leads to the advantage that the user can select either a long recording duration or a better quality of the recorded messages.

According to another embodiment, automatic switching means are provided, so that one part of the message is recorded with a high quality and another part with a low quality.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
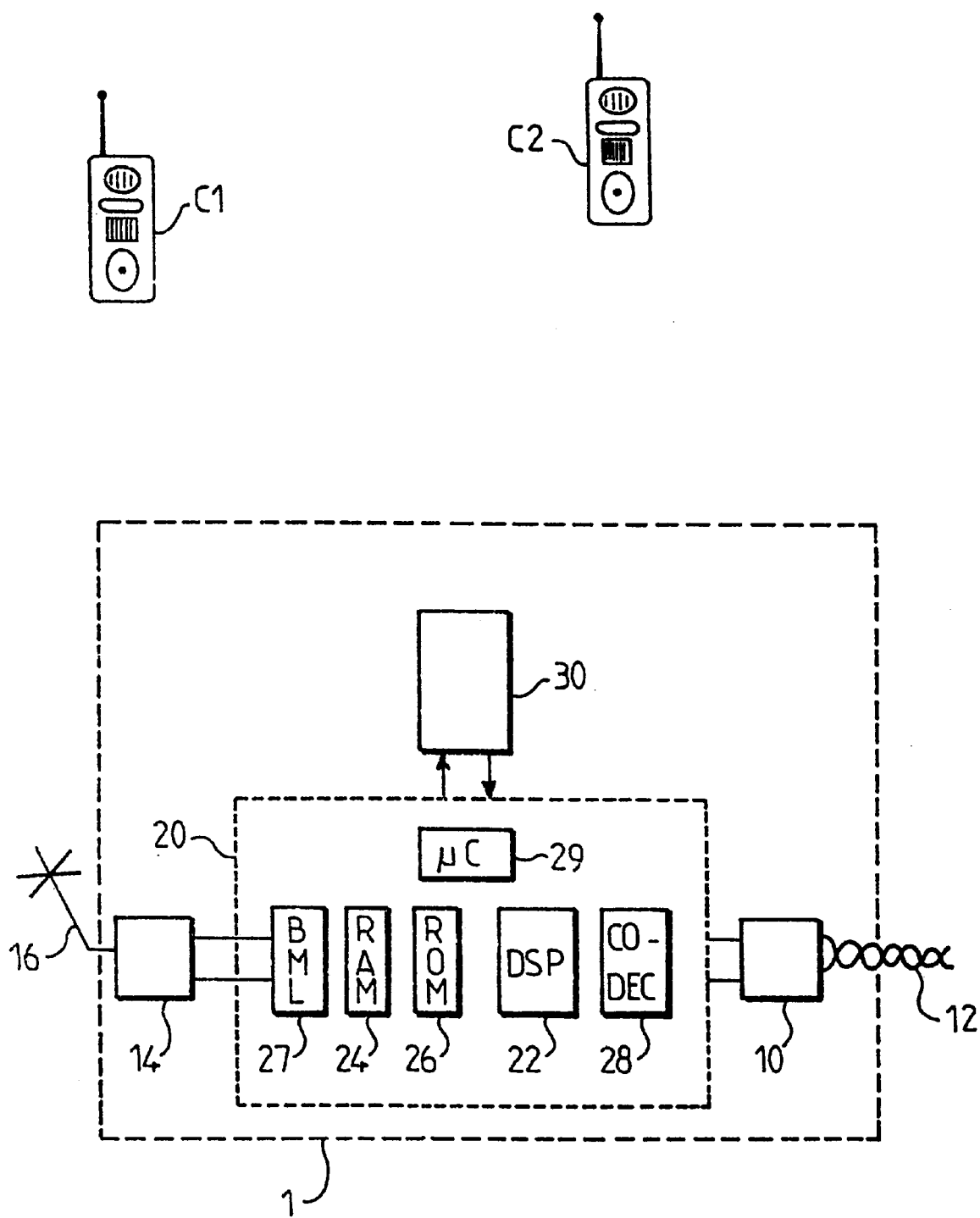
FIG. 1 shows a device according to the invention.

In FIG. 1, the device shown is a device satisfying the DECT standards. Reference 1 shows the basic circuit to which may be connected a plurality of handsets C1, C2, ... by radio channel. This basic circuit comprises, for example, a line circuit 10 which permits the basic circuit to be connected to a telephone line 12 and a radio circuit 14 which authorizes the dialogue with the various handsets C1, C2, ..., by transmitting and receiving waves via an antenna 16. For processing all the information conveyed inside the basic circuit, a digital processing element 20 is provided. This element is formed, as usual, by:

a signal processor 22 which co-operates with a random-access memory 24 and with a read-only memory 26 containing operation instructions, an interface circuit 27 which arranges the digital data according to the DECT standards so that they are transmitted via the radio circuit 14, a codec 28 for digitally coding the speech signals which are analog by nature, and a microcontroller 29 for managing all the functions of this element.

This element 20 is formed by an integrated circuit registered as PCX509x manufactured by Philips Semiconductors. The basic circuit 1 also comprises a memory 30 of the type known by the name of flash memory forming the essence of the responder. The memory 30 is thus intended to contain messages necessary for the function of responder. Still within the scope of the described example, this memory has a capacity of 4 megabits organized in octets. This memory provides a message duration of about 5 minutes.

Figure 2:
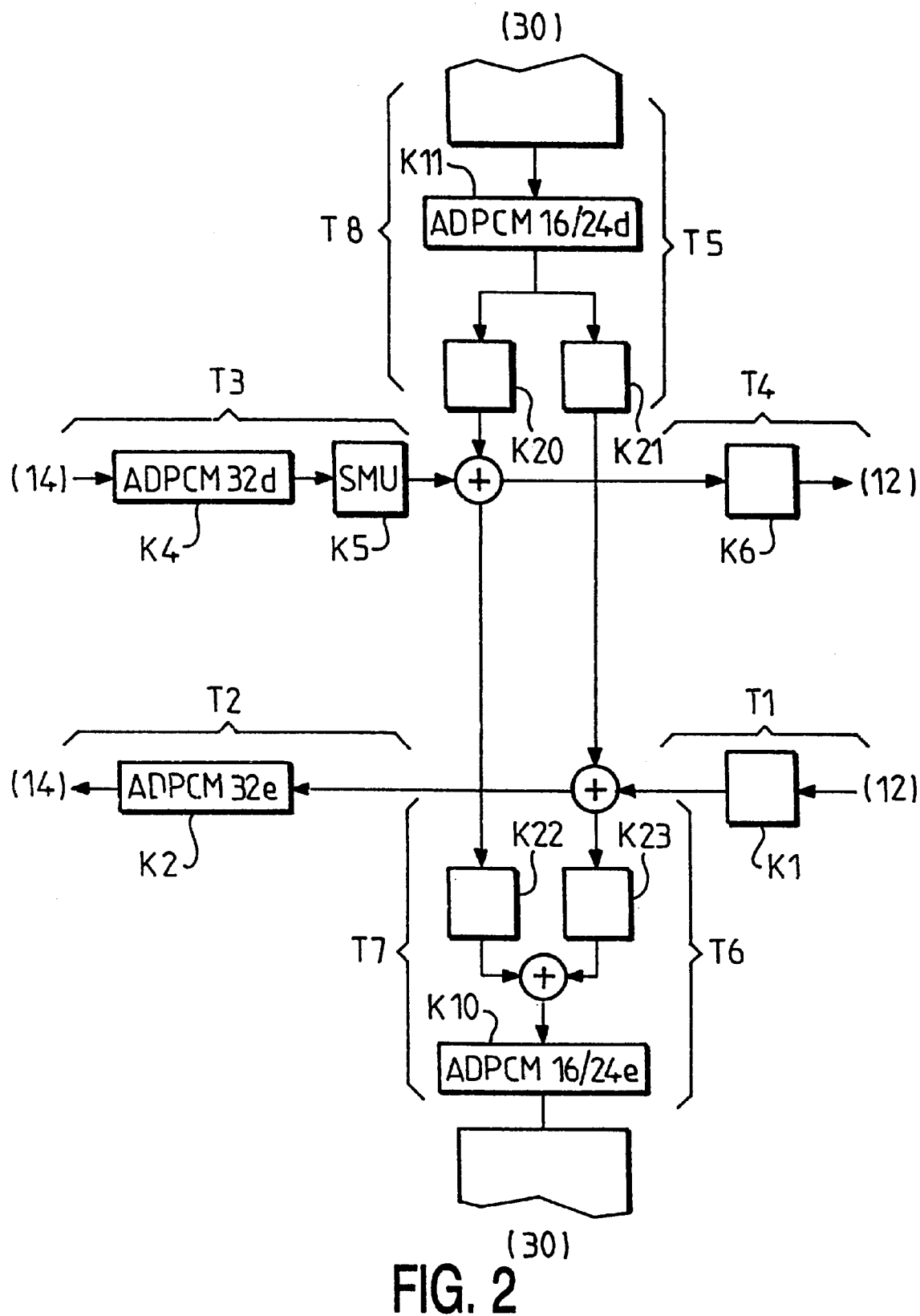
FIG. 2 shows an operation diagram of the device shown in FIG. 1.

The operation of the device is explained with the aid of FIG. 2. In this Figure, the various blocks represent processing tasks to be carried out by the processing element 20, more particularly, by the element 22. These tasks are carried out as a function of the data path. Thus, the processing is carried out along path T1, T2 for the data which come from the telephone line 12 and go to the handsets C1, C2, ..., while passing through the radio circuit 14. The paths T3 and T4 relate to the data coming from the above handsets and going to the line 12. In the path T1 is found box K1 which indicates a processing at the level of the signals coming from the line 12 and which signals take the form of linear samples of 16 bits (PCM coding) produced by the codec 28. Before they are transmitted to the circuit 14, these signals are converted into differential ADPCM codes (box K2) in the path T2 in a handset format. This code is defined by the CCITT standard G726. In the path T3, the signals which come from the circuit 14 which take the form of ADPCM signals are coded in a binary code via decoding shown in box K4 and also undergo a "silent" processing in box K5. In the path T4, the level is adjusted to the box K6 before transmission takes place over the line 12 via the line circuit 10 after a digital/analog conversion carried out by the codec 28.

According to one aspect of the invention, the data are written in the memory 30 after an ADPCM coding indicated in box K10 and the data coming from this memory are linearly coded via the decoding indicated in box K11. To provide that the memory does not have too large a capacity, this ADPCM coding/decoding is a process which produces fewer bits than for the handsets. The G726 standard mentioned above gives any indication for this type of processing according to various differential code formats. Thus, shown in FIG. 2 are:

an ADPCM16$d$ decoding (ADPCM24$d$, respectively) for denoting a code conversion from a differential code whose rate is 16 kbit/s (24 kbit/s, respectively) to a linear code having a rate of 64 kbit/s, an ADPCM16$e$ coding (ADPCM24$e$, respectively) for the reverse operation, that is to say, passing from a linear 64 kbit/s code to a differential 16 kbit/s code (24 kbit/s code, respectively), an ADPCM32$d$ decoding for denoting a code conversion from a differential code whose rate is 32 kbit/s to a linear code having a rate of 64 kbit/s, an ADPCM32$e$ coding for the reverse operation, that is to say, changing from a linear 64 kbit/s code to a differential 32 kbit/s code.

In that which follows, especially the differential 16 kbit/s code will be mentioned for clarity. But, it will be obvious that the 24 kbit/s code may be used without leaving the scope of the invention.

Summarizing, the paths T1, T2, T3 and T4 represent an operation that does not involve the responder, that is to say, involving a 32 kbit coder and a 32 kbit decoder.

The paths T1 and T6 represent the operation when a message coming from line 12 is recorded, which implies a 16 kbit coding operation.

The paths T5 and T2 represent the operation when a message written in the memory 30 is listened to from a handset, which implies a 16 kbit decoding operation and a 32 kbit coding operation.

The paths T3 and T7 represent the operation when a message coming from a handset is recorded. This implies a 32 kbit decoding and a 16 kbit coding.

The paths T8 and T4 represent the operation when a message is sent over the line. This implies a 16 kbit decoding.

All the paths are determined by switching tasks represented by the boxes K20, K21, K22 and K23.

Thus, according to the measures recommended by the invention, it will be obvious that the presence of the responder does not practically cause any additional burden on the processing element 22.

According to one embodiment, the coding operations indicated in box K10 and the decoding operations indicated in box K11 are carried out in one of the formats for the differential code responder defined during the manufacturing.

According to another embodiment, this format may be chosen by the user who may optionally prefer, on the one hand, a better quality of sound restoration for which he then chooses the first format of 24 kbit/s or, on the other hand, a longer period for storing the message for which he thus chooses the second format of 16 kbit/s. The speech samples for these formats are 3 and 2 bits respectively.

Figure 3:
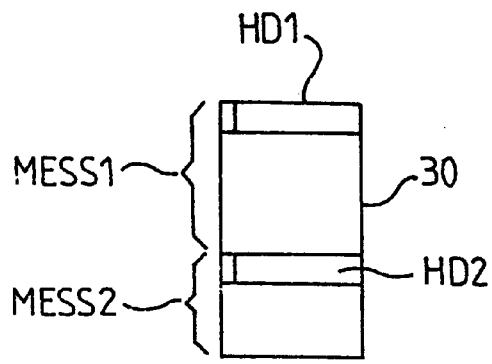
FIG. 3 shows the organization of the memory that forms part of the responder.

As is shown in FIG. 3, for processing these two formats, headers HD1, HD2 are incorporated, assigned each to messages MESS1 and MESS2, respectively. A binary element "bd" in this header permits to determine whether one has to do with the first format of 24 kbit/s (bd=1) or with the second format of 16 kbit/s (bd=0).

Figure 4:
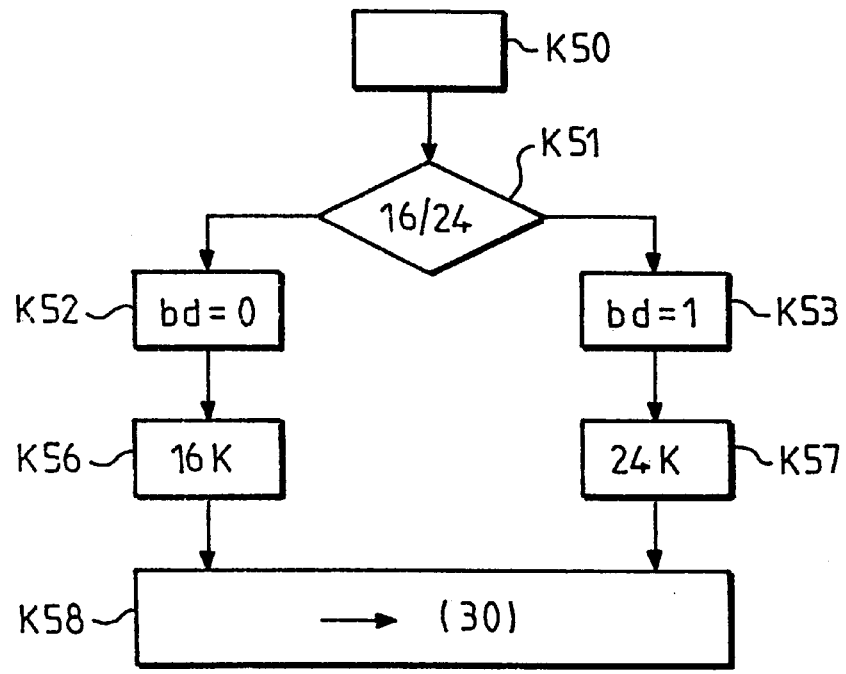
FIG. 4 is a flow chart showing how the messages are recorded as a function of the desired coding.

FIG. 4 explains the operation of recording a message. The box K50 indicates the start of the operation where an item of a menu appears on the screen of the handset inviting the user to choose between the first and the second format. This choice being made (box K51), the binary element bd is positioned in boxes K52 and K53. The message is then processed with the appropriate coders as this has been shown in boxes K56 and K57, before the message is written in the memory 30 (box K58).

Figure 5:
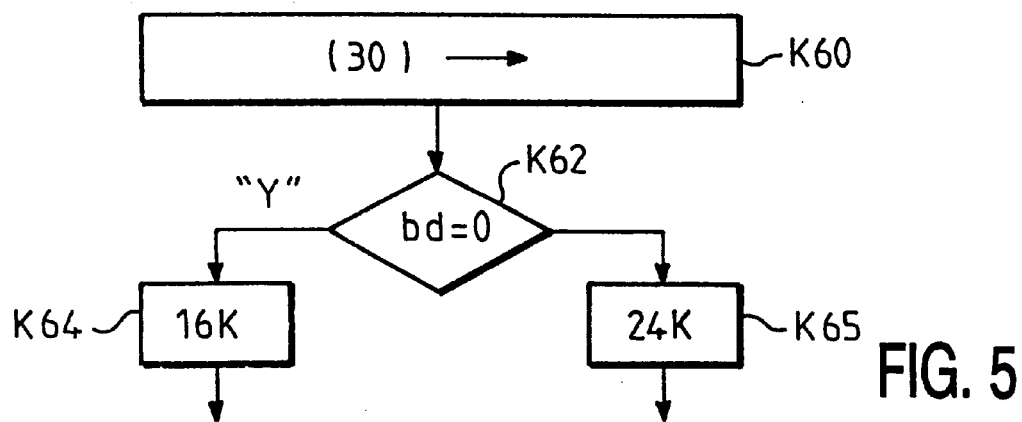
FIG. 5 is a flow chart showing how the messages are recorded as a function of the coding according to which they have been recorded.

FIG. 5 shows the process of the message written in memory 30 (box K60) being restored. The header is read and the binary element "bd" is decoded (box K62). It is this binary element that will define the use of the appropriate decoder, either the 16K decoder (box K64), or the 24K decoder (box K65).

It is also possible to provide automatic switching means so that a part of the message is recorded with a high quality and another part with a low quality. In that case, the header HD will contain an additional bit for signaling that the message is in two parts and that one message is to be recorded with a high quality and the other is not.

What is claimed is:

1. A telephone device comprising:
   a responder having a memory;
   a processor for processing digital speech signals having a first code on signal lines connecting an input and an output of said telephony device; and
   a converter located between said memory and said signal lines wherein, prior to storing in said memory, said converter codes said digital speech signals into a second code for storage in said memory, and wherein, prior to reading from said memory, said converter decodes said digital speech signals of said second code stored in said memory into said first code; wherein said processor controls said converter, and wherein said digital speech signals stored and read from said memory have one of a first format and a second format; said first format providing higher quality speech than said second format.

2. The telephony device of claim 1, wherein said first code is a linear code and said second code is a differential code.

3. The telephony device of claim 1, wherein a user chooses between said first format and said second format.

4. The telephony device of claim 1, wherein a header of said digital speech signals stored or read from said memory includes a bit having values identifying said first format and said second format.

5. The telephony device of claim 1, wherein a first part of said digital speech signals are stored or read from said memory in said first format and a second part of said digital speech signals are stored or read from said memory in said second format.

6. The telephony device of claim 1, further comprising another converter located between said input and said output, wherein said another converter codes said digital speech signals received from a sampler which samples input speech signals received from a telephone line from said first code to said second code for transmission over radio channels, and wherein said another converter decodes received speech signals received over said radio channels from said second code to said first code for transmission over said telephone line.

7. A base station connected to a telephone line for communication with a wireless handset comprising:
   a transceiver;
   a responder having a memory;
   a processor for processing digital speech signals, said digital speech signals having a first code on signal lines between said telephone line and said transceiver;
   said transceiver exchanging said digital speech signals having a second code with said wireless handset; and
   a converter which, prior to storing in said memory, codes said digital speech signals into said second code for storage in said memory, and wherein, prior to reading from said memory, said converter decodes said digital speech signals of said second code stored in said memory into said first code; said digital speech signals stored and read from said memory having one of a first format and a second format, said first format providing higher quality speech than said second format.

8. The base station of claim 7, wherein said first code is a linear code and said second code is a differential code.

9. The base station of claim 7, wherein a user chooses between said first format and said second format.

10. The base station of claim 7, wherein a header of said digital speech signals stored or read from said memory includes a bit having values identifying said first format and said second format.

11. The base station of claim 7, wherein a first part of said digital speech signals are stored or read from said memory in said first format and a second part of said digital speech signals are stored or read from said memory in said second format.

12. The base station of claim 7, further comprising another converter located between said telephone line and said transceiver, wherein said another converter codes said digital speech signals received from a sampler which samples input speech signals received from said telephone line from said first code to said second code for transmission to said wireless handset; and wherein said another converter decodes received speech signals, which are received from said wireless handset, from said second code to said first code for transmission over said telephone line.

13. A method of converting speech signals in a wireless telephony device comprising:

converting in a base station said speech signals received on a telephone line to a first code;

converting in said base station said speech signals, which are received from a wireless handset, from a second code to said first code;

converting said speech signals having said first code to said second code to form compressed speech signals, wherein said compressed speech signals have one of a first format and a second format;

selecting between one of said first format and said second format, said first format providing higher quality speech than said second format; and storing said compressed speech signals in a memory of a responder of said base station.

14. The method of claim 13, further comprising retrieving said compressed speech signals from said memory; and converting said compressed speech signals retrieved from said memory from said second code to said first code.

15. The method of claim 13, further comprising providing a header for said compressed speech signals, said header including a bit having values identifying said first format and said second format.

\* \* \* \* \*